United States Patent
Cai et al.

(10) Patent No.: US 12,068,995 B2
(45) Date of Patent: Aug. 20, 2024

(54) METHOD FOR PROCESSING UPLINK REFERENCE SIGNAL AND RELATED APPARATUS

(71) Applicant: HUAWEI TECHNOLOGIES CO., LTD., Shenzhen (CN)

(72) Inventors: Hua Cai, Shanghai (CN); Bin Liu, Shanghai (CN); Zhenyuan Chen, Shanghai (CN); Xueqin Gu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/733,178

(22) Filed: Apr. 29, 2022

(65) Prior Publication Data

US 2022/0255687 A1    Aug. 11, 2022

Related U.S. Application Data

(63) Continuation of application No. PCT/CN2020/125194, filed on Oct. 30, 2020.

(30) Foreign Application Priority Data

Oct. 31, 2019  (CN) .......................... 201911069249.7

(51) Int. Cl.
  *H04W 24/10*   (2009.01)
  *H04L 5/00*    (2006.01)

(52) U.S. Cl.
  CPC ............ *H04L 5/005* (2013.01); *H04L 5/0044* (2013.01); *H04W 24/10* (2013.01)

(58) Field of Classification Search
  None
  See application file for complete search history.

(56) References Cited

U.S. PATENT DOCUMENTS 9,867,034 B2 *  1/2018  Choi ...................... H04L 25/00
2013/0170454 A1  7/2013  Zhou et al.
(Continued)

FOREIGN PATENT DOCUMENTS

CN    1842180 A    10/2006
CN    102668613 A    9/2012
(Continued)

OTHER PUBLICATIONS

Extended European Search Report issued in corresponding European Application No. 20883119.8, dated Nov. 8, 2022, pp. 1-6.
(Continued)

*Primary Examiner* — Anh Vu H Ly
(74) *Attorney, Agent, or Firm* — HAUPTMAN HAM, LLP

(57) ABSTRACT

A method for processing an uplink reference signal includes determining a current baseband processing payload, and processing each of N received uplink reference signals according to a preset first condition in response to the baseband processing payload being less than a first preset value or processing each uplink reference signal in a signal set according to a preset second condition in response to the baseband processing payload being greater than a second preset value. The second preset value is greater than or equal to the first preset value. The signal set includes one or more of the N uplink reference signals. A baseband processing payload corresponding to processing an uplink reference signal according to the preset second condition is less than a baseband processing payload corresponding to processing an uplink reference signal according to the preset first condition. N is a positive integer.

20 Claims, 4 Drawing Sheets

(56) References Cited

U.S. PATENT DOCUMENTS

| | | |
|---|---|---|
| 2013/0336179 A1 | 12/2013 | Rubin et al. |
| 2016/0037550 A1 | 2/2016 | Barabell et al. |
| 2016/0150531 A1 | 5/2016 | Johansson et al. |
| 2018/0054239 A1 | 2/2018 | Bengtsson et al. |
| 2018/0054806 A1* | 2/2018 | Balachandran ....... H04W 72/23 |
| 2018/0242349 A1* | 8/2018 | Noh ...................... H04W 72/56 |
| 2019/0285722 A1 | 9/2019 | Markhovsky et al. |
| 2020/0221473 A1* | 7/2020 | Krishnaswamy ..... H04W 72/52 |
| 2023/0085553 A1* | 3/2023 | Lee ..................... H04W 52/367 370/329 |

FOREIGN PATENT DOCUMENTS

| | | |
|---|---|---|
| CN | 103702363 A | 4/2014 |
| CN | 104067689 A | 9/2014 |
| CN | 104123185 A | 10/2014 |
| CN | 104853417 A | 8/2015 |
| CN | 106358202 A | 1/2017 |
| EP | 2991412 A1 | 3/2016 |
| HU | E029750 T2 | 4/2017 |
| WO | 2011097366 A2 | 8/2011 |
| WO | 2014101808 A1 | 7/2014 |
| WO | 2015085561 A1 | 6/2015 |
| WO | 2016029364 A1 | 3/2016 |
| WO | 2019191318 A1 | 10/2019 |

OTHER PUBLICATIONS

3GPP TSG RAN WG1 Meeting NR#3,R1-1715425, Overview of bandwidth part, CA, and DC operation including SRS switching, Huawei, HiSilicon, Nagoya, Japan, Sep. 18-21, 2017, total 14 pages.

International Search Report issued in corresponding International Application No. PCT/CN2020/125194, dated Jan. 27, 2021, pp. 1-8.

Chinese Office Action issued in corresponding Chinese Application No. 201911069249.7, dated Jan. 20, 2022, pp. 1-7.

India Office Action issued in corresponding India Application No. 202227021876, dated Sep. 5, 2022, pp. 1-7.

* cited by examiner

METHOD FOR PROCESSING UPLINK REFERENCE SIGNAL AND RELATED APPARATUS

CROSS-REFERENCE TO RELATED APPLICATIONS

This application is a continuation of International Application No. PCT/CN2020/125194, filed on Oct. 30, 2020, which claims priority to Chinese Patent Application No. 201911069249.7, filed on Oct. 31, 2019, the disclosures of the aforementioned applications are hereby incorporated by reference in their entireties.

TECHNICAL FIELD

Embodiments of this application relate to the field of communication technologies, and in particular, to a method for processing an uplink reference signal and a related apparatus.

BACKGROUND

With the development of the society and the improvement of people's requirements, a communication system plays an increasingly important role in people's lives.

In the communication system, to trace and monitor a channel and to ensure performance of an online terminal device, the online terminal device sends an uplink reference signal to a base station. After receiving the uplink reference signal, the base station measures a plurality of requirement items of the channel based on the uplink reference signal. As a quantity of online terminal devices increases, a quantity of uplink reference signals received by the base station increases accordingly. In addition, with the applications of uplink coordinated multipoint transmission technologies and downlink coordinated multipoint transmission technologies, the quantity of uplink reference signals received by the base station further increases. In addition, to further ensure the performance of the online terminal device, a transmission periodicity of the uplink reference signal is usually shortened, or the base station sends downlink signaling to trigger the online terminal device to send the uplink reference signal. In the foregoing scenarios, a baseband processing payload of the base station increases.

Therefore, a method is required to avoid an excessively high baseband processing payload of the base station. However, currently, in whatever scenario, the base station processes the received uplink reference signals by using a same method. This thus cannot avoid an excessively high baseband processing payload.

SUMMARY

Embodiments of this application provide a method for processing an uplink reference signal and a related apparatus, to reduce a baseband processing payload of a base station when the baseband processing payload is high, to avoid an excessively high baseband processing payload.

A first aspect of one or more embodiments of this application provides a method for processing an uplink reference signal.

After receiving N uplink reference signals, a base station first determines a current baseband processing payload, and processes the N uplink reference signals based on the baseband processing payload.

Each of the N received uplink reference signals is processed according to a preset first rule if the baseband processing payload is less than a first preset value, where N is a positive integer.

Each uplink reference signal in a signal set is processed according to a preset second rule if the baseband processing payload is greater than a second preset value, where the second preset value is greater than or equal to the first preset value, the signal set includes one or more of the N uplink reference signals, and the first preset value may be equal to the second preset value, or the first preset value may be not equal to the second preset value.

Because a baseband processing payload corresponding to processing an uplink reference signal according to the second rule is less than a baseband processing payload corresponding to processing an uplink reference signal according to the first rule, when the baseband processing payload is low, processing the N uplink reference signals according to the first rule can ensure performance of a terminal device. When the baseband processing payload is high, compared with processing the uplink reference signal in the signal set according to the first rule, processing the uplink reference signal in the signal set according to the second rule can reduce the baseband processing payload, thereby avoiding an excessively high baseband processing payload.

Based on the first aspect, one or more embodiments of this application further provide a first implementation of the first aspect, and the processing each uplink reference signal in a signal set according to a preset second rule includes:

for each uplink reference signal in the signal set, measuring K requirement items in M requirement items, and skipping measuring requirement items other than the K requirement items in the M requirement items, where the M requirement items are requirement items to be measured as specified by the first rule, K and M are positive integers, and K is less than M.

Compared with processing the uplink reference signal according to the first rule, processing the uplink reference signal according to the second rule has fewer requirement items to be measured, and a corresponding baseband processing payload is lower, thereby reducing the baseband processing payload.

Based on the first aspect, one or more embodiments of this application further provide a second implementation of the first aspect, and the processing each uplink reference signal in a signal set according to a preset second rule includes:

for each uplink reference signal in the signal set, measuring K requirement items in M preset requirement items at a second periodicity, where the second periodicity is greater than a first periodicity for measuring the K requirement items as specified by the first rule, K and M are positive integers, and K is less than M.

Compared with processing the uplink reference signal according to the first rule, processing the uplink reference signal according to the second rule has a longer periodicity for measuring the K requirement items. This means that the K requirement items need to be measured for fewer times in a same time period, and a corresponding baseband processing payload is lower, thereby reducing the baseband processing payload.

Based on the first aspect, one or more embodiments of this application further provide a third implementation of the first aspect, and the processing each uplink reference signal in a signal set according to a preset second rule includes:

for each uplink reference signal in the signal set, measuring K requirement items in M preset requirement items at a second measurement granularity, where the second measurement granularity is greater than a first measurement granularity adopted for measuring the K requirement items as specified by the first rule, K and M are positive integers, and K is less than M.

Compared with processing the uplink reference signal according to the first rule, processing the uplink reference signal according to the second rule adopts a larger measurement granularity for measuring the K requirement items, and a corresponding baseband processing payload is lower, thereby reducing the baseband processing payload.

Based on the first aspect, one or more embodiments of this application further provide a fourth implementation of the first aspect, and the processing each uplink reference signal in a signal set according to a preset second rule includes:

for each uplink reference signal in the signal set, measuring K requirement items in M preset requirement items according to a second algorithm, where a baseband processing payload corresponding to the second algorithm is less than a baseband processing payload corresponding to a first algorithm, the first algorithm is an algorithm adopted for measuring the K requirement items as specified by the first rule, K and M are positive integers, and K is less than M.

Compared with processing the uplink reference signal according to the first rule, processing the uplink reference signal according to the second rule reduces a corresponding baseband processing payload due to a change of the algorithm.

Based on the first aspect, one or more embodiments of this application further provide a fifth implementation of the first aspect:

Processing the uplink reference signal in the signal set according to the second rule is specifically processing the K requirement items in the M requirement items. Therefore, before the processing each uplink reference signal in a signal set according to a preset second rule, for each uplink reference signal in the signal set, the base station determines the K requirement items from the M requirement items.

There are a plurality of methods for determining the K requirement items.

Based on the first aspect, one or more embodiments of this application further provide a sixth implementation of the first aspect:

for each uplink reference signal in the signal set, the determining the K requirement items from the M requirement items may include:

for each uplink reference signal in the signal set, determining the K requirement items from the M requirement items based on a terminal device feature corresponding to the uplink reference signal in the signal set.

There are a plurality of methods for determining the K requirement items. One or more embodiments of this application provide a feasible solution to determining the K requirement items.

Based on the first aspect, one or more embodiments of this application further provide a seventh implementation of the first aspect, and the terminal device feature includes a moving speed of a terminal device; and if the moving speed of the terminal device is less than a third preset value, the K requirement items include a weight value requirement item and/or a timing advance TA value requirement item.

Based on the first aspect, one or more embodiments of this application further provide an eighth implementation of the first aspect, and the terminal device feature includes a delay spread of a terminal device; and if the delay spread of the terminal device is less than a fourth preset value, the K requirement items include a weight value requirement item.

Based on the first aspect, one or more embodiments of this application further provide a ninth implementation of the first aspect. Because the uplink reference signal in the signal set is processed according to the second rule in embodiments of this application, when the baseband processing payload is greater than the second preset value, the signal set is determined based on the N uplink reference signals.

Based on the first aspect, one or more embodiments of this application further provide a tenth implementation of the first aspect, and the determining the signal set based on the N uplink reference signals may include:

determining the signal set based on terminal device service information corresponding to each of the N uplink reference signals.

There are a plurality of methods for determining the signal set. Embodiments of this application provide a feasible solution to determining the signal set.

Based on the first aspect, one or more embodiments of this application further provide an eleventh implementation of the first aspect, and the terminal device service information includes a service volume of the terminal device in a preset time period; and the determining the signal set based on terminal device service information corresponding to each of the N uplink reference signals includes:

if a service volume of a terminal device corresponding to a first uplink reference signal in the preset time period is less than a fifth preset value, determining the first uplink reference signal as an uplink reference signal in the signal set, where the first uplink reference signal is any one of the N uplink reference signals.

If the service volume of the terminal device corresponding to the first uplink reference signal is less than the fifth preset value, it indicates that the terminal device has no service requirement or has a low service requirement. Therefore, the first uplink reference signal with a service volume less than the fifth preset value is used as an uplink reference signal in the signal set. This can avoid a great impact caused by the second rule on a service requirement of the terminal device corresponding to the first uplink reference signal, and reduce the baseband processing payload.

Based on the first aspect, one or more embodiments of this application further provide a twelfth implementation of the first aspect:

Because the signal set includes one or more of the N uplink signals, there may be an uplink reference signal not included in the signal set. When there is an uplink reference signal not included in the signal set, the method further includes:

processing, according to the first rule, the uplink reference signal in the N uplink reference signals that is not included in the signal set.

Processing the uplink reference signal in the signal set according to the second rule can reduce the baseband processing payload. Processing, according to the first rule, the uplink reference signal not included in the signal set can better ensure performance of a terminal device corresponding to each uplink reference signal not included in the signal set.

A second aspect of one or more embodiments of this application provides an apparatus for processing an uplink reference signal, including:

a first determining unit, configured to determine a current baseband processing payload; and a processing unit, configured to process each of N received uplink reference signals according to a preset first rule if the baseband processing payload is less than a first preset value, where N is a positive integer, and the processing unit is further configured to process each uplink reference signal in a signal set according to a preset second rule if the baseband processing payload is greater than a second preset value, where the second preset value is greater than or equal to the first preset value, the signal set includes one or more of the N uplink reference signals, and a baseband processing payload corresponding to processing an uplink reference signal according to the second rule is less than a baseband processing payload corresponding to processing an uplink reference signal according to the first rule.

Based on the second aspect, one or more embodiments of this application further provide a first implementation of the second aspect, and the processing unit is specifically configured to:

for each uplink reference signal in the signal set, measure K requirement items in M requirement items, and skip measuring requirement items other than the K requirement items in the M requirement items, where the M requirement items are requirement items to be measured as specified by the first rule, K and M are positive integers, and K is less than M.

Based on the second aspect, one or more embodiments of this application further provide a second implementation of the second aspect, and the processing unit is specifically configured to:

for each uplink reference signal in the signal set, measure K requirement items in M preset requirement items at a second periodicity, where the second periodicity is greater than a first periodicity for measuring the K requirement items as specified by the first rule, K and M are positive integers, and K is less than M.

Based on the second aspect, one or more embodiments of this application further provide a third implementation of the second aspect, and the processing unit is specifically configured to:

for each uplink reference signal in the signal set, measure K requirement items in M preset requirement items at a second measurement granularity, where the second measurement granularity is greater than a first measurement granularity adopted for measuring the K requirement items as specified by the first rule, K and M are positive integers, and K is less than M.

Based on the second aspect, one or more embodiments of this application further provide a fourth implementation of the second aspect, and the processing unit is specifically configured to:

for each uplink reference signal in the signal set, measure K requirement items in M preset requirement items according to a second algorithm, where a baseband processing payload corresponding to the second algorithm is less than a baseband processing payload corresponding to a first algorithm, the first algorithm is an algorithm adopted for measuring the K requirement items as specified by the first rule, K and M are positive integers, and K is less than M.

Based on the second aspect, one or more embodiments of this application further provide a fifth implementation of the second aspect, and the apparatus for processing an uplink reference signal further includes:

a second determining unit, configured to, for each uplink reference signal in the signal set, determine the K requirement items from the M requirement items.

Based on the second aspect, one or more embodiments of this application further provide a sixth implementation of the second aspect, and the second determining unit is specifically configured to:

for each uplink reference signal in the signal set, determine the K requirement items from the M requirement items based on a terminal device feature corresponding to the uplink reference signal in the signal set.

Based on the second aspect, one or more embodiments of this application further provide a seventh implementation of the second aspect, and the apparatus for processing an uplink reference signal further includes:

a third determining unit, configured to determine the signal set based on the N uplink reference signals.

Based on the second aspect, one or more embodiments of this application further provide an eighth implementation of the second aspect, and the third determining unit is specifically configured to:

determine the signal set based on terminal device service information corresponding to each of the N uplink reference signals.

Based on the second aspect, one or more embodiments of this application further provide a ninth implementation of the second aspect, the terminal device service information includes a service volume of a terminal device in a preset time period, and the third determining unit is specifically configured to:

if a service volume of a terminal device corresponding to a first uplink reference signal in the preset time period is less than a fifth preset value, determine the first uplink reference signal as an uplink reference signal in the signal set, where the first uplink reference signal is any one of the N uplink reference signals.

Based on the second aspect, one or more embodiments of this application further provide a tenth implementation of the second aspect, the processing unit is further configured to process, according to the first rule, an uplink reference signal in the N uplink reference signals that is not included in the signal set.

A third aspect of one or more embodiments of this application provides a communication apparatus, including at least one processor and a power supplying circuit. The power supplying circuit is used to supply power to the processor, and related program instructions are executed by the at least one processor, to enable the communication apparatus to implement the method according to any one of the implementations of the first aspect of this application.

A fourth aspect of one or more embodiments of this application provides a computer-readable storage medium, including instructions. When the instructions are run on a computer, the computer is enabled to perform the method according to any one of the implementations of the first aspect of this application.

A fifth aspect of one or more embodiments of this application provides a computer program product. The computer program product includes computer software instructions. The computer software instructions may be loaded by using a processor to implement a process of the method according to any one of the implementations of the first aspect.

It can be learned from the foregoing technical solutions that one or more embodiments of this application have the following advantages:

The current baseband processing payload is first determined. Each of the N received uplink reference signals is processed according to the preset first rule if the baseband processing payload is less than the first preset value, to ensure performance of the terminal device corresponding to the N uplink reference signals. Each uplink reference signal in the signal set is processed according to the preset second rule if the baseband processing payload is greater than the second preset value. The signal set includes one or more of the N uplink reference signals. Because a baseband processing payload corresponding to processing an uplink reference signal according to the second rule is less than a baseband processing payload corresponding to processing an uplink reference signal according to the first rule, when the baseband processing payload is high, compared with processing the uplink reference signal in the signal set according to the first rule, processing the uplink reference signal in the signal set according to the second rule in embodiments of this application can reduce the baseband processing payload of the base station, thereby avoiding an excessively high baseband processing payload.

DESCRIPTION OF EMBODIMENTS

One or more embodiments of this application provide a method for processing an uplink reference signal and a related apparatus, to reduce a baseband processing payload of a base station when the baseband processing payload is high, to avoid an excessively high baseband processing payload.

Figure 1:
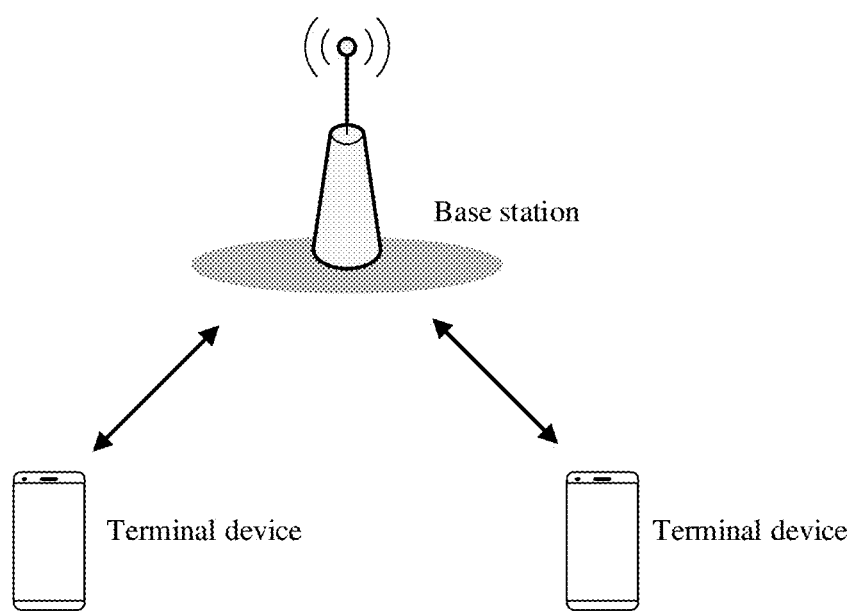
FIG. 1 is a schematic diagram of an architecture of a communication system according to at least an embodiment of this application.

One or more embodiments of this application may be applied to an architecture of a communication system shown in FIG. 1. The communication system includes at least one base station and at least one terminal device. One base station and two terminal devices in a coverage area of the base station are shown in the figure. The base station provides a radio access service for the plurality of terminal devices in the coverage area of the base station, and the terminal devices may communicate with the base station by using a link.

In one or more embodiments of this application, the communication system may be various radio access technology (RAT) systems, for example, a code division multiple access (CDMA) system, a time division multiple access (TDMA) system, a frequency division multiple access (FDMA) system, an orthogonal FDMA (OFDMA) system, a single carrier FDMA (SC-FDMA) system, and another system. The terms "system" and "network" can be interchanged with each other. The CDMA system may implement a radio technology such as universal terrestrial radio access (UTRA) and CDMA 2000. The UTRA includes a wideband CDMA (W-CDMA) technology and another variant technology of CDMA. The CDMA 2000 covers interim standard (IS) 2000 (IS-2000), and IS-95 and IS-856 standards. The TDMA system may implement a wireless technology such as a global system for mobile communications (GSM). The OFDMA system may implement a wireless technology such as evolved UTRA (E-UTRA), ultra mobile broadband (UMB), IEEE 802.11 (Wi-Fi), IEEE 802.16 (WiMAX), IEEE 802.20, and Flash-OFDM. The UTRA and the E-UTRA are parts of a universal mobile telecommunications system (UMTS). 3GPP long term evolution (LTE) and various releases evolved based on LTE are new releases of the UMTS using the E-UTRA. In addition, the communication system 100 is further applicable to a 5G system and a future-oriented communication technology, such as a 6G system.

A system architecture and a service scenario that are described in embodiments of this application are intended to describe technical solutions in embodiments of this application more clearly, and do not constitute a limitation to the technical solutions provided in embodiments of this application. A person skilled in the art may know that, with the evolution of network architectures and emergence of new service scenarios, the technical solutions provided in embodiments of this application are also applicable to similar technical problems.

The base station in one or more embodiments of this application is an apparatus that is deployed in a radio access network and that is configured to provide a wireless communication function for a terminal device. The base station may include a macro base station, a micro base station (also referred to as a small cell), a relay station, an access point, and the like in various forms. A device having a base station function may have different names in systems using different radio access technologies, and may be a base transceiver station (BTS) in GSM or CDMA, or may be a NodeB (NodeB) in W-CDMA, or may be an evolved NodeB (eNB or e-NodeB) in LTE, or a transmission reception point (TRP), a gNodeB, or the like in a 5G system. For ease of description, in embodiments of this application, all the foregoing apparatuses that provide a wireless communication function for a terminal device are referred to as base stations.

The terminal device in one or more embodiments of this application may include various terminal devices that have a wireless communication function and that may communicate with one or more core networks by using a radio access network (RAN) and that provide voice and/or data connectivity for a user. The terminal device may be referred to as a terminal for short. The terminal device may be a handheld device, a vehicle-mounted device, a wearable device, or a computing device that has a wireless communication function, or another processing device connected to a wireless modem. In embodiments of this application, the terminal device may also be referred to as a subscriber unit (subscriber unit), a subscriber station (subscriber station), a mobile station (mobile station), a mobile (mobile), a remote station (remote station), a remote terminal (remote terminal), an access terminal (access terminal), a user terminal (user terminal), a user agent (user agent), a user device (user device), a personal communications service (PCS) phone, a cordless phone, a mobile phone, a "cellular" phone, a smartphone (smartphone), a wireless local loop (WLL) station, a personal digital assistant (PDA), or another device.

It should be understood that, to trace and monitor a channel and to ensure performance of an online terminal device, a terminal device that communicates with a base station by using a link sends an uplink reference signal to the base station. After receiving the uplink reference signal, the base station processes the uplink reference signal, to be specific, measures a plurality of requirement items for the channel.

In some embodiments, the base station receives a plurality of uplink reference signals. When a baseband processing payload of the base station is low, processing the plurality of uplink reference signals increases the baseband processing payload of the base station, but does not cause an excessively high baseband processing payload. However, when a baseband processing payload of the base station is high, processing the plurality of uplink reference signals may cause an excessively high baseband processing payload of the base station, resulting in excessively high processing costs of the base station.

Therefore, to avoid an excessively high baseband processing payload, one or more embodiments of this application provide a method for processing an uplink reference signal. In the method, a received uplink reference signal is differentially processed based on a current baseband processing payload of the base station. To be specific, when the baseband processing payload is low, the received uplink reference signal is processed in a first manner; when the baseband processing payload is high, the received uplink reference signal is processed in a second manner. A baseband processing payload corresponding to the second manner is less than a baseband processing payload corresponding to the first manner. Therefore, the baseband processing payload can be reduced, thereby avoiding an excessively high baseband processing payload.

In the foregoing process, the uplink reference signal may be a sounding reference signal SRS, or may be a demodulation reference signal DMRS. During the description of the method for processing an uplink reference signal below, the SRS is mainly used as an example for description.

Figure 2:
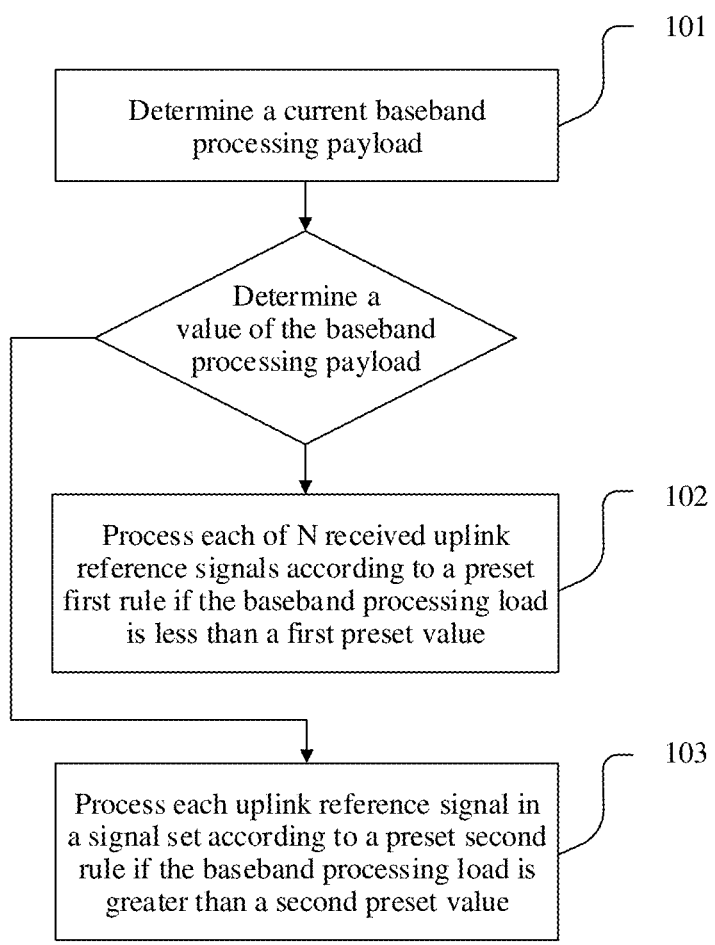
FIG. 2 is a schematic diagram of at least an embodiment of a method for processing an uplink reference signal according to at least an embodiment of this application.

To better understand the method for processing an uplink reference signal provided in one or more embodiments of this application, refer to FIG. 2. FIG. 2 is a schematic diagram of an embodiment of a method for processing an uplink reference signal according to at least an embodiment of this application. As shown in FIG. 2, one or more embodiments of this application provide an embodiment of a method for processing an uplink reference signal. The method is applied to a base station and includes the following operations:

Operation 101. Determine a current baseband processing payload.

In one or more embodiments of this application, a received uplink reference signal is differentially processed based on the baseband processing payload. Therefore, after receiving N uplink reference signals, a base station first determines the current baseband processing payload. A method for determining the current baseband processing payload is a mature technology, and details are not described herein in this embodiment of this application.

Operation 102. Process each of the N received uplink reference signals according to a preset first rule if the baseband processing payload is less than a first preset value, where N is a positive integer.

Operation 103. Process each uplink reference signal in a signal set according to a preset second rule if the baseband processing payload is greater than a second preset value, where the second preset value is greater than or equal to the first preset value, the signal set includes one or more of the N uplink reference signals, and a baseband processing payload corresponding to processing an uplink reference signal according to the second rule is less than a baseband processing payload corresponding to processing an uplink reference signal according to the first rule.

The signal set may include the N received uplink reference signals, or may include some of the N uplink reference signals. This is not limited in embodiments of this application, and may be specifically adjusted based on an actual situation.

There may be one signal set or a plurality of signal sets. When there are a plurality of signal sets, each signal set corresponds to one second rule, and different signal sets may correspond to a same second rule or different second rules. This is not limited in this embodiment of this application.

Figure 3:
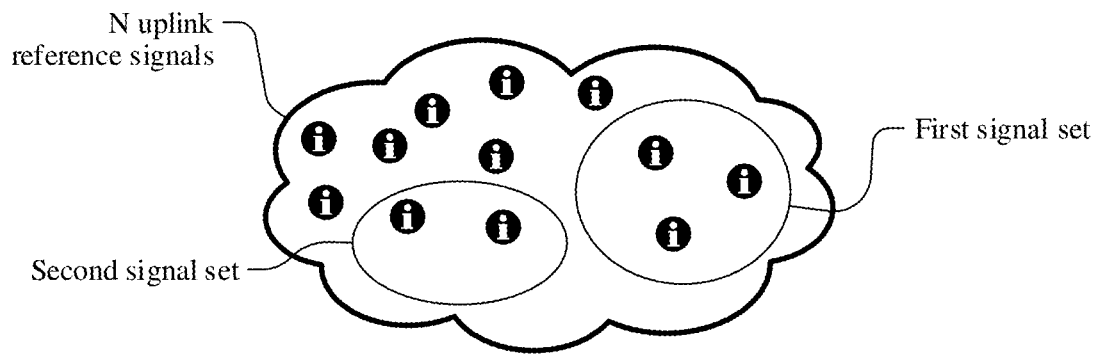
FIG. 3 is a schematic diagram of a relationship between N uplink reference signals and signal sets according to at least an embodiment of this application.

FIG. 3 is a schematic diagram of a relationship between N uplink reference signals and signal sets according to one or more an embodiment of this application. The N uplink reference signals shown in FIG. 3 are included in a first signal set and a second signal set. The first signal set includes three uplink reference signals, the second signal set includes two uplink reference signals, and the first signal set and the second signal set may correspond to different second rules. It should be noted that FIG. 3 is merely used to indicate the relationship between the N uplink reference signals and the signal sets, and a quantity of the N uplink reference signals, a quantity of the signal sets, and a quantity of uplink reference signals in each signal set are not limited to quantities shown in FIG. 3.

Figure 4:
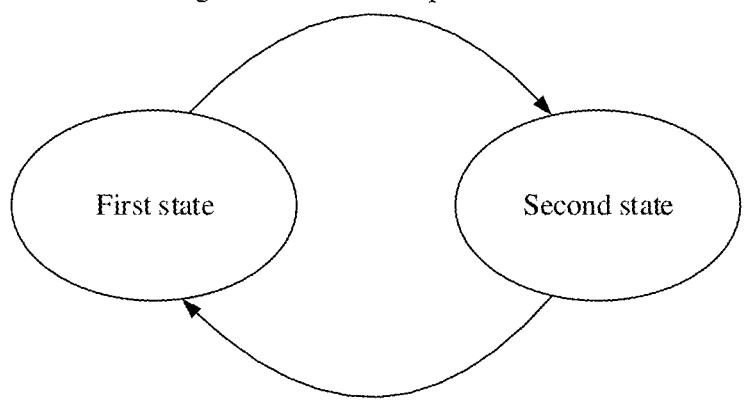
FIG. 4 is a schematic diagram of state switching of a base station according to at least an embodiment of this application.

According to operation 102 and operation 103, it can be learned that a base station performs state switching based on a value of a baseband processing payload. FIG. 4 is a schematic diagram of state switching of the base station according to one or more an embodiments of this application. When the baseband processing payload is less than the first preset value, the base station enters a first state. In the first state, the base station processes the N uplink reference signals according to the first rule. When the baseband processing payload is greater than the second preset value, the base station enters a second state. In the second state, the base station processes an uplink reference signal in the signal set according to the second rule.

Content of the first rule and content of the second rule are not specifically limited in this embodiment of this application, provided that the baseband processing payload corresponding to processing an uplink reference signal according to the second rule is less than the baseband processing payload corresponding to processing an uplink reference signal according to the first rule.

In one or more embodiments of this application, processing of the uplink reference signal includes measurement of a plurality of requirement items. Correspondingly, the content of both the first rule and the second rule may include a quantity of requirement items, an algorithm adopted for measuring the requirement items, a periodicity for measuring the requirement items, a measurement granularity for measuring the requirement items, and the like. In addition, the first rule and the second rule may further include other content.

A type of a requirement item is related to an uplink reference signal. When the uplink reference signal is a sounding reference signal, the requirement item includes but is not limited to a signal-to-noise ratio, a physical downlink shared channel PDSCH/physical downlink control channel PDCCH weighting value, a timing advance (TA) value, an angle of arrival (AoA) value, a moving speed, and a delay spread. When the uplink reference signal is a demodulation reference signal, the requirement item may include the foregoing requirement items, and may further include a requirement item related to demodulation, for example, a signal-to-noise ratio before demodulation and a signal-to-noise ratio after demodulation.

In addition, in one or more embodiments of this application, the first preset value and the second preset value may be set based on an actual requirement, and specific values of the first preset value and the second preset value are not limited, provided that the second preset value is not less than the first preset value.

For example, the first preset value and the second preset value may be set based on a performance requirement of a terminal device. When the baseband processing payload is less than the first preset value, the base station processes the uplink reference signal according to the first rule, and the baseband payload corresponding to the first rule is higher than the baseband payload corresponding to the second rule. This means that it is more complex for the base station to process the uplink reference signal according to the first rule, so that a channel can be better traced and monitored, thereby better ensuring performance of the terminal device.

Therefore, if a terminal device has a high performance requirement, difficulty for the base station to switch to the second state needs to be increased, and difficulty for the base station to switch to the first state needs to be reduced, so that the base station can process the uplink reference signal according to the first rule as much as possible. In this case, both the first preset value and the second preset value need to be set to large values, to ensure performance of all terminal devices as much as possible. If a terminal device has a low performance requirement, difficulty for the base station to switch to the second state may be reduced, and difficulty for the base station to switch to the first state may be increased, so that the base station can process the uplink reference signal according to the second rule as much as possible. Correspondingly, both the first preset value and the second preset value may be set to small values, to ensure as much as possible that the baseband processing payload of the base station is not excessively high.

In addition, the first preset value and the second preset value may be set based on a quantity of terminal devices in a current time period. When there are a large quantity of terminal devices in the current time period, the baseband processing payload of the base station is extremely high. Therefore, difficulty for the base station to switch to the second state may be reduced, and difficulty for the base station to switch to the first state may be increased, so that the base station can process the uplink reference signal according to the second rule as much as possible. Correspondingly, both the first preset value and the second preset value may be set to small values, to ensure as much as possible that the baseband processing payload of the base station is not excessively high. On the contrary, when there is a small quantity of terminal devices in the current time period, both the first preset value and the second preset value may be set to large values.

In one or more embodiments of this application, because the baseband processing payload corresponding to processing an uplink reference signal according to the second rule is less than the baseband processing payload corresponding to processing an uplink reference signal according to the first rule, when the baseband processing payload is high, compared with processing the uplink reference signal in the signal set according to the first rule, processing the uplink reference signal in the signal set according to the second rule in embodiments of this application can reduce the baseband processing payload of the base station, thereby avoiding an excessively high baseband processing payload.

It can be learned from the foregoing content that processing rule combinations of the first rule and processing rule combinations of the second rule have a plurality of combination scenarios. The following describes in detail, according to different second rules, a process of processing an uplink reference signal in a signal set according to the second rule.

One or more embodiments of this application provide another embodiment of a method for processing an uplink reference signal.

In one or more embodiments, the processing each uplink reference signal in a signal set according to a preset second rule includes:

for each uplink reference signal in the signal set, measuring K requirement items in M requirement items, and skipping measuring requirement items other than the K requirement items in the M requirement items, where the M requirement items are requirement items to be measured as specified by the first rule, K and M are positive integers, and K is less than M.

For example, it is assumed that M is 8 and K is 5. When the baseband processing payload is less than the first preset value, processing an uplink reference signal by the base station according to the first rule includes measurement of eight requirement items. When the baseband processing payload is greater than the second preset value, processing an uplink reference signal in the signal set by the base station according to the second rule includes measurement of only five requirement items.

It can be learned that, compared with processing the uplink reference signal according to the first rule, processing the uplink reference signal according to the second rule has fewer requirement items to be measured, and a corresponding baseband processing payload is lower, so that the baseband processing payload can be reduced, thereby avoiding an excessively high baseband processing payload.

One or more embodiments of this application provide another method for processing an uplink reference signal.

In one or more embodiments, the processing each uplink reference signal in a signal set according to a preset second rule includes:

for each uplink reference signal in the signal set, measuring K requirement items in M preset requirement items at a second periodicity, where the second periodicity is greater than a first periodicity for measuring the K requirement items as specified by the first rule, K and M are positive integers, and K is less than M.

The K requirement items are not specifically limited in this embodiment of this application.

It can be understood that, because the terminal device periodically sends an uplink reference signal to the base station, compared with processing the uplink reference signal according to the first rule, processing the uplink reference signal according to the second rule has a longer periodicity for measuring the K requirement items. In this case, the K requirement items are measured for fewer times in a same time period, and a corresponding baseband processing payload is lower.

Specifically, the first periodicity is 100 ms, and the second periodicity is 200 ms. If the uplink reference signal is processed according to the first rule, the K requirement items are measured for six times within one min. If the uplink reference is processed according to the second rule, the K requirement items are measured for three times within one min.

There are a plurality of manners of processing the K requirement items at the second periodicity. For example, a periodicity for the terminal device to send uplink reference signals may remain unchanged. It is assumed that the periodicity for the terminal device to send uplink reference signals is 100 ms, but the base station selects some uplink reference signals from received uplink reference signals, and processes the selected uplink reference signals at a periodicity of 200 ms. Within one minute, the terminal device sends six uplink reference signals, and the base station selects three uplink reference signals for processing. Alternatively, the periodicity for the terminal device to send uplink reference signals may be adjusted. The periodicity for the terminal device to send uplink reference signals is adjusted to 200 ms. In this case, the base station processes each of received uplink reference signals. Within one minute, the terminal device sends three uplink reference signals, and the base station processes only three uplink reference signals.

It can be learned from the foregoing analysis that, compared with processing the uplink reference signal according to the first rule, processing the uplink reference signal according to the second rule causes a lower baseband processing payload.

One or more Embodiments of this application provide another method for processing an uplink reference signal.

In one or more embodiments, the processing each uplink reference signal in a signal set according to a preset second rule includes:

for each uplink reference signal in the signal set, measuring K requirement items in M preset requirement items at a second measurement granularity, where the second measurement granularity is greater than a first measurement granularity adopted for measuring the K requirement items as specified by the first rule, K and M are positive integers, and K is less than M.

The second measurement granularity and the first measurement granularity may be time domain granularities, or may be frequency domain granularities.

For example, the second measurement granularity and the first measurement granularity are frequency domain granularities. It is assumed that the first measurement granularity is two RBs, that is, one requirement item is measured by using two RBs, the second measurement granularity is eight RBs, that is, one requirement item is measured by using eight RBs, and a total bandwidth is 40 RBs. When measurement is performed at the second measurement granularity, the base station only needs to measure five requirement items at one time. When measurement is performed at the first measurement granularity, the base station needs to measure 20 requirement items at one time. Therefore, compared with processing the uplink reference signal according to the first rule, processing the uplink reference signal according to the second rule adopts a larger measurement granularity, and a corresponding baseband processing payload is lower.

One or more embodiments of this application provide another embodiment of a method for processing an uplink reference signal.

In one or more embodiments, the processing each uplink reference signal in a signal set according to a preset second rule includes:

for each uplink reference signal in the signal set, measuring K requirement items in M preset requirement items according to a second algorithm, where a baseband processing payload corresponding to the second algorithm is less than a baseband processing payload corresponding to a first algorithm, the first algorithm is an algorithm adopted for measuring the K requirement items as specified by the first rule, K and M are positive integers, and K is less than M.

It can be understood that, when the baseband processing payload is greater than the second preset value, the K requirement items may be measured by using a simplified algorithm, and when the baseband processing payload is less than the first preset value, the K requirement items may be measured by using an algorithm with high complexity.

Compared with processing the uplink reference signal according to the first rule, processing the uplink reference signal according to the second rule reduces a corresponding baseband processing payload due to a change of the algorithm.

The foregoing several embodiments include a process of processing the K requirement items in the M requirement items. Therefore, before the K requirement items are processed, the K requirement items need to be determined first.

Therefore, one or more embodiments of this application provide another method for processing an uplink reference signal. In one or more embodiments, before the processing each uplink reference signal in a signal set according to a preset second rule, the method further includes:

for each uplink reference signal in the signal set, determining the K requirement items from the M requirement items.

It should be noted that there are a plurality of methods for determining the K requirement items from the M requirement items. This is not limited in this embodiment of this application. For example, the K requirement items may be determined randomly, or the K requirement items may be determined according to a specific rule. Because the K requirement items may be processed at a large periodicity, a large measurement granularity, or according to a simplified algorithm, a rule is generally set to determine the K requirement items from the M requirement items to avoid a great impact on the terminal device caused by processing the K requirement items.

It can be learned from the foregoing content that there are a plurality of methods for determining the K requirement items. The following describes one of the methods for determining the K requirement items. One or more embodiments of this application provide another embodiment of a method for processing an uplink reference signal, the determining the K requirement items from the M requirement items includes:

for each uplink reference signal in the signal set, determining the K requirement items from the M requirement items based on a terminal device feature corresponding to the uplink reference signal in the signal set.

It should be noted that the terminal device feature includes but is not limited to a moving speed, a delay spread, and a signal-to-noise ratio. This is not limited in this embodiment of this application.

One or more embodiments of this application provide another method for processing an uplink reference signal, and the terminal device feature includes a moving speed of a terminal device; and if the moving speed of the terminal device is less than a third preset value, the K requirement items include a weight value and/or a timing advance TA value. The third preset value may be set according to an actual requirement.

It should be noted that, the moving speed is less than the third preset value. Correspondingly, channel coherence time of a user is greater than a time range. Within the time range, a channel of the user approximately remains unchanged in time domain. This means that a requirement on time domain measurement frequency of an uplink reference signal is low. Therefore, the K requirement items may be processed at a longer periodicity. The K requirement items may be a weight value and/or a TA value, but are not limited to a weight value and/or a TA value.

One or more Embodiments of this application provide another method for processing an uplink reference signal, and the terminal device feature includes a delay spread of a terminal device; and if the delay spread of the terminal device is less than a fourth preset value, the K requirement items include a weight value. The fourth preset value may be set according to an actual requirement.

It should be noted that, the delay spread of the terminal device is less than the fourth preset value. Correspondingly, a channel coherence bandwidth of a user is greater than a bandwidth range. Within the bandwidth range, a channel of the user approximately remains unchanged in frequency domain, and a requirement on frequency domain measurement frequency of an uplink reference signal is low. Therefore, the K requirement items may be processed at a larger measurement granularity. The K requirement items may be a weight value, but are not limited to a weight value.

In the description, the K requirement items are determined based on the terminal device feature corresponding to the uplink reference signal. In addition, the K requirement items may be determined by using another method. For example, compared with measuring another requirement item, measuring a requirement item such as a weight value or an AOA value corresponds to a higher baseband processing payload. Therefore, the weight value requirement item and the AOA value requirement item may be used as the K requirement items, and then the weight value requirement item and the AOA value requirement item are measured by using a simplified second algorithm. In this way, the baseband processing payload of the base station is effectively reduced.

It can be learned from the foregoing content that, when the baseband processing payload is greater than the second preset value, the uplink reference signal in the signal set is processed according to the second rule. Therefore, embodiments of this application provide another embodiment of a method for processing an uplink reference signal. In this embodiment, the method for processing an uplink reference signal further includes: determining the signal set based on the N uplink reference signals.

There are a plurality of methods for determining the signal set. For example, some or all uplink reference signals may be randomly selected from the N uplink reference signals as uplink reference signals in the signal set, or the signal set may be determined according to a specific rule. This is not limited in this embodiment of this application.

It can be understood that the step of determining the signal set according to the N uplink reference signals needs to be performed before the step of processing each uplink reference signal in a signal set according to a preset second rule, and also needs to be performed before the step of determining the K requirement items from the M requirement items for each uplink reference signal in the signal set.

It can be learned from the foregoing description that there are a plurality of methods for determining the signal set. The following specifically describes a process of determining the signal set by using one method as an example.

One or more embodiments of this application provide another method for processing an uplink reference signal, and the determining the signal set based on the N uplink reference signal includes:

determining the signal set based on terminal device service information corresponding to each of the N uplink reference signals.

It should be noted that, in this embodiment of this application, the signal set is determined based on the terminal device service information, so that an uplink reference signal that is suitable to be processed according to the second rule can be determined, thereby avoiding, as much as possible, a great impact caused by the second rule on a terminal device service corresponding to the uplink reference signal.

There are also a plurality of manners of determining the signal set based on the terminal device service information. This is not limited in this embodiment of this application. The following specifically describes a process of determining the signal set based on the terminal device service information by using one of the manners.

One or more embodiments of this application provide another method for processing an uplink reference signal. In this embodiment, the terminal device service information includes a service volume of a terminal device in a preset time period.

The determining the signal set based on terminal device service information corresponding to each of the N uplink reference signals includes:

if a service volume of a terminal device corresponding to a first uplink reference signal in the preset time period is less than a fifth preset value, determining the first uplink reference signal as an uplink reference signal in the signal set, where the first uplink reference signal is any one of the N uplink reference signals.

It can be understood that, if the service volume of the terminal device corresponding to the first uplink reference signal is less than the fifth preset value, it indicates that the terminal device has no service requirement or has a low service requirement. Therefore, the first uplink reference signal with a service volume less than the fifth preset value is used as an uplink reference signal in the signal set. This can avoid a great impact caused by the second rule on a service requirement of the terminal device corresponding to the first uplink reference signal, and reduce the baseband processing payload.

Because the signal set includes one or more of the N uplink signals, there may be an uplink reference signal not included in the signal set. When there is an uplink reference signal not included in the signal set, the uplink reference signal not included in the signal set needs to be processed.

Therefore, one or more embodiments of this application provide another method for processing an uplink reference signal. In this embodiment, the method further includes: processing, according to the first rule, an uplink reference signal in the N uplink reference signals that is not included in the signal set.

It can be understood that the N uplink reference signals may include an uplink reference signal that is not suitable to be processed according to the second rule. Therefore, an uplink reference signal not included in the signal set is processed according to the first rule, so that performance of a terminal device corresponding to each uplink reference signal not included in the signal set can be better ensured.

Figure 5:
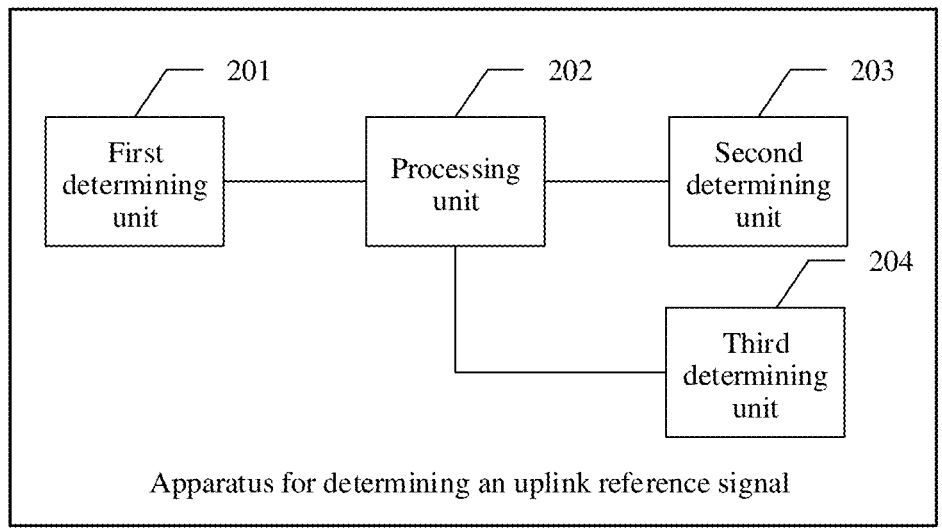
FIG. 5 is a schematic diagram of at least an embodiment of an apparatus for processing an uplink reference signal according to at least an embodiment of this application.

FIG. 5 is a schematic diagram of one or more embodiments of an apparatus for processing an uplink reference signal according to at least an embodiment of this application.

As shown in FIG. 5, one or more embodiments of this application provide at least an embodiment of an apparatus for processing an uplink reference signal, including:

a first determining unit 201, configured to determine a current baseband processing payload; and a processing unit 202, configured to process each of N received uplink reference signals according to a preset first rule if the baseband processing payload is less than a first preset value, where N is a positive integer, and the processing unit 202 is further configured to process each uplink reference signal in a signal set according to a preset second rule if the baseband processing payload is greater than a second preset value, where the second preset value is greater than or equal to the first preset value, the signal set includes one or more of the N uplink reference signals, and a baseband processing payload corresponding to processing an uplink reference signal according to the second rule is less than a baseband processing payload corresponding to processing an uplink reference signal according to the first rule.

One or more embodiments of this application provide another embodiment of an apparatus for processing an uplink reference signal, and the processing unit 202 is specifically configured to:

for each uplink reference signal in the signal set, measure K requirement items in M requirement items, and skip measuring requirement items other than the K requirement items in the M requirement items, where the M requirement items are requirement items to be measured as specified by the first rule, K and M are positive integers, and K is less than M.

One or more embodiments of this application provide another embodiment of an apparatus for processing an uplink reference signal, and the processing unit 202 is specifically configured to:

for each uplink reference signal in the signal set, measure K requirement items in M preset requirement items at a second periodicity, where the second periodicity is greater than a first periodicity for measuring the K requirement items as specified by the first rule, K and M are positive integers, and K is less than M.

One or more embodiments of this application provide another embodiment of an apparatus for processing an uplink reference signal, and the processing unit 202 is specifically configured to:

for each uplink reference signal in the signal set, measure K requirement items in M preset requirement items at a second measurement granularity, where the second measurement granularity is greater than a first measurement granularity adopted for measuring the K requirement items as specified by the first rule, K and M are positive integers, and K is less than M.

One or more embodiments of this application provide another embodiment of an apparatus for processing an uplink reference signal, and the processing unit 202 is specifically configured to:

for each uplink reference signal in the signal set, measure K requirement items in M preset requirement items according to a second algorithm, where a baseband processing payload corresponding to the second algorithm is less than a baseband processing payload corresponding to a first algorithm, the first algorithm is an algorithm adopted for measuring the K requirement items as specified by the first rule, K and M are positive integers, and K is less than M.

One or more embodiments of this application provide another embodiment of an apparatus for processing an uplink reference signal. As shown in FIG. 5, in at least this embodiment, the apparatus for processing an uplink reference signal further includes:

a second determining unit 203, configured to, for each uplink reference signal in the signal set, determine the K requirement items from the M requirement items.

One or more embodiments of this application provide another embodiment of an apparatus for processing an uplink reference signal, and the second determining unit 203 is specifically configured to:

for each uplink reference signal in the signal set, determine the K requirement items from the M requirement items based on a terminal device feature corresponding to the uplink reference signal in the signal set.

One or more embodiments of this application provide another embodiment of an apparatus for processing an uplink reference signal. As shown in FIG. 5, in this embodiment, the apparatus for processing an uplink reference signal further includes: a third determining unit 204, configured to determine the signal set based on the N uplink reference signals.

One or more embodiments of this application provide another embodiment of an apparatus for processing an uplink reference signal, and the third determining unit 204 is specifically configured to:

determine the signal set based on terminal device service information corresponding to each of the N uplink reference signals.

One or more embodiments of this application provide another embodiment of an apparatus for processing an uplink reference signal, the terminal device service information includes a service volume of a terminal device in a preset time period, and the third determining unit 204 is specifically configured to:

if a service volume of a terminal device corresponding to a first uplink reference signal in the preset time period is less than a fifth preset value, determine the first uplink reference signal as an uplink reference signal in the signal set, where the first uplink reference signal is any one of the N uplink reference signals.

Figure 6:
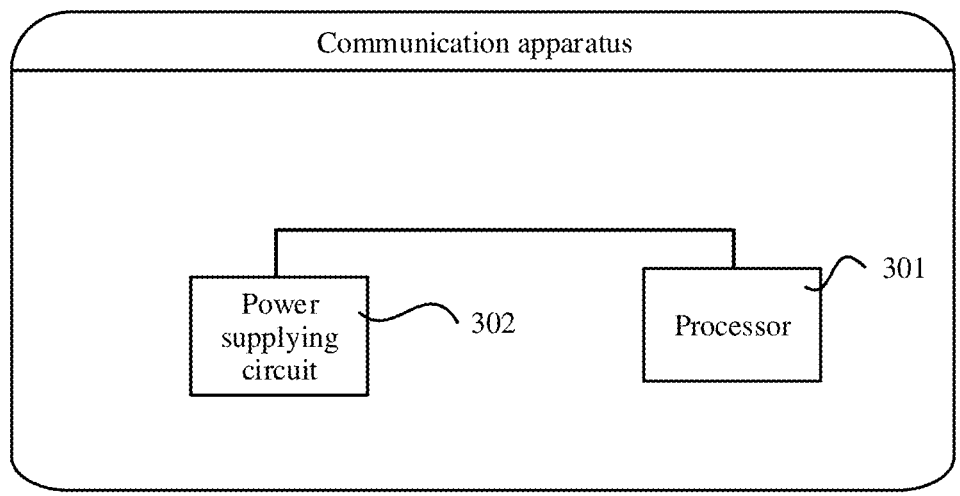
FIG. 6 is a schematic diagram of at least an embodiment of a communication apparatus according to at least an embodiment of this application.

One or more embodiments of this application provide another embodiment of an apparatus for processing an uplink reference signal, and the processing unit 202 is further configured to: process, according to the first rule, an uplink reference signal in the N uplink reference signals that is not included in the signal set FIG. 6 is a schematic diagram of an embodiment of a communication apparatus according to an embodiment of this application. One or more embodiments of this application further provide an embodiment of a communication apparatus, including: at least one processor 301 and a power supplying circuit 302. The power supplying circuit 302 is configured to supply power to the processor 301, and related program instructions are executed by the at least one processor 301, to enable the communication apparatus to implement the method according to any one of embodiments of this application.

In at least this embodiment, the processor 301 may perform an operation performed by the apparatus for processing an uplink reference signal in the embodiment shown in FIG. 5, and details are not described herein again.

In at least this embodiment, specific function module division of the processor 301 may be similar to function module division of units such as the first determining unit, the processing unit, the second determining unit, and the third determining unit described in FIG. 5, and details are not described herein again.

The power supplying circuit 302 in this embodiment of this application includes but is not limited to at least one of the following: a power supplying subsystem, a power management chip, a power consumption management processor, or a power consumption management control circuit.

One or more embodiments of this application provide a computer-readable storage medium, including instructions. When the instructions are run on a computer, the computer is enabled to perform the method according to any one of embodiments of this application.

One or more embodiments of this application further provide a computer program product. The computer program product includes computer software instructions. The computer software instructions may be loaded by using a processor to implement a process of the method for processing an uplink reference signal in FIG. 2.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and is sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method for processing an uplink reference signal, comprising:
    determining a current baseband processing payload; and
    processing each of N received uplink reference signals according to a preset first condition in response to the baseband processing payload being less than a first preset value, wherein N is a positive integer; or
    processing each uplink reference signal in a signal set according to a preset second condition in response to the baseband processing payload being greater than a second preset value, wherein the second preset value is greater than or equal to the first preset value, the signal set comprises one or more of the N uplink reference signals, and a baseband processing payload corresponding to processing an uplink reference signal according to the preset second condition is less than a baseband processing payload corresponding to processing an uplink reference signal according to the preset first condition.

2. The method according to claim 1, wherein the processing each uplink reference signal in the signal set according to the preset second condition comprises:
    for each uplink reference signal in the signal set, measuring K requirement items in M requirement items, and skipping measuring requirement items other than the K requirement items in the M requirement items, wherein the M requirement items are specified by the preset first condition, where K and M are positive integers, and K is less than M.

3. The method according to claim 1, wherein the processing each uplink reference signal in the signal set according to the preset second condition comprises:

for each uplink reference signal in the signal set, measuring K requirement items in M preset requirement items at a second period, wherein the second period is greater than a first period for measuring the K requirement items as specified by the preset first condition, where K and M are positive integers, and K is less than M.

4. The method according to claim 1, wherein the processing each uplink reference signal in the signal set according to the preset second condition comprises:

for each uplink reference signal in the signal set, measuring K requirement items in M preset requirement items at a second measurement granularity, wherein the second measurement granularity is greater than a first measurement granularity for measuring the K requirement items as specified by the preset first condition, where K and M are positive integers, and K is less than M.

5. The method according to claim 1, wherein the processing each uplink reference signal in the signal set according to the preset second condition comprises:

for each uplink reference signal in the signal set, measuring K requirement items in M preset requirement items according to a second algorithm, wherein a baseband processing payload corresponding to the second algorithm is less than a baseband processing payload corresponding to a first algorithm, the first algorithm is utilized for measuring the K requirement items as specified by the preset first condition, where K and M are positive integers, and K is less than M.

6. The method according to claim 1, wherein before the processing each uplink reference signal in the signal set according to the preset second condition, the method further comprises:

for each uplink reference signal in the signal set, determining K requirement items from M requirement items, where K and M are positive integers, and K is less than M.

7. The method according to claim 6, wherein for each uplink reference signal in the signal set, the determining the K requirement items from the M requirement items comprises:

for each uplink reference signal in the signal set, determining the K requirement items from the M requirement items based on a terminal device feature corresponding to the uplink reference signal in the signal set.

8. The method according to claim 7, wherein the terminal device feature comprises a moving speed of a terminal device; and the K requirement items include at least one of a weight value requirement item, or a timing advance (TA) value requirement item in response to the moving speed of the terminal device being less than a third preset value.

9. The method according to claim 7, wherein the terminal device feature comprises a delay spread of a terminal device; and the K requirement items comprise a weight value requirement item in response to the delay spread of the terminal device being less than a fourth preset value.

10. The method according to claim 1, wherein the method further comprises:

determining the signal set based on the N uplink reference signals.

11. The method according to claim 10, wherein the determining the signal set based on the N uplink reference signals comprises:

determining the signal set based on a terminal device service information corresponding to each of the N uplink reference signals.

12. The method according to claim 11, wherein the terminal device service information comprises a service volume of a terminal device in a preset time period; and the determining the signal set based on the terminal device service information corresponding to each of the N uplink reference signals comprises:

determining a first uplink reference signal as an uplink reference signal in the signal set in response to a service volume of the terminal device corresponding to a first uplink reference signal in the preset time period being less than a fifth preset value, wherein the first uplink reference signal is one of the N uplink reference signals.

13. The method according to claim 1, wherein the method further comprises:

processing, according to the preset first condition, an uplink reference signal in the N uplink reference signals that is not comprised in the signal set.

14. A communication apparatus, comprising:

a processor; and a memory coupled to the processor, the memory configured to store non-transitory instructions, and in response to being executed by the processor, cause the communication apparatus to execute operations comprising:

determining a current baseband processing payload; and processing each of N received uplink reference signals according to a preset first condition in response to the baseband processing payload being less than a first preset value, wherein N is a positive integer; or processing each uplink reference signal in a signal set according to a preset second condition in response to the baseband processing payload being greater than a second preset value, wherein the second preset value is greater than or equal to the first preset value, the signal set comprises one or more of the N uplink reference signals, and a baseband processing payload corresponding to processing an uplink reference signal according to the preset second condition is less than a baseband processing payload corresponding to processing an uplink reference signal according to the preset first condition.

15. The communication apparatus according to claim 14, wherein the processing each uplink reference signal in the signal set according to the preset second condition comprises:

for each uplink reference signal in the signal set, measuring K requirement items in M requirement items, and skipping measuring requirement items other than the K requirement items in the M requirement items, wherein the M requirement items are specified by the preset first condition, where K and M are positive integers, and K is less than M.

16. The communication apparatus according to claim 14, wherein the processing each uplink reference signal in the signal set according to the preset second condition comprises:

for each uplink reference signal in the signal set, measuring K requirement items in M preset requirement items at a second period, wherein the second period is greater than a first period for measuring the K requirement items as specified by the preset first condition, where K and M are positive integers, and K is less than M.

17. The communication apparatus according to claim 14, wherein the processing each uplink reference signal in the signal set according to the preset second condition comprises:
    for each uplink reference signal in the signal set, measuring K requirement items in M preset requirement items at a second measurement granularity, wherein the second measurement granularity is greater than a first measurement granularity for measuring the K requirement items as specified by the preset first condition, where K and M are positive integers, and K is less than M.

18. The communication apparatus according to claim 14, wherein the processing each uplink reference signal in the signal set according to the preset second condition comprises:
    for each uplink reference signal in the signal set, measuring K requirement items in M preset requirement items according to a second algorithm, wherein a baseband processing payload corresponding to the second algorithm is less than a baseband processing payload corresponding to a first algorithm, the first algorithm is utilized for measuring the K requirement items as specified by the preset first condition, where K and M are positive integers, and K is less than M.

19. The communication apparatus according to claim 14, wherein the non-transitory instructions further cause the communication apparatus to perform operations further comprising:
    before the processing each uplink reference signal in the signal set according to the preset second condition, for each uplink reference signal in the signal set, determining K requirement items from the M requirement items, where K and M are positive integers, and K is less than M.

20. A non-transitory computer-readable storage medium, wherein the computer-readable storage medium comprises instructions, and in response to the instructions being executed by a processor, the processor is configured to perform:
    determining a current baseband processing payload; and
    processing each of N received uplink reference signals according to a preset first condition in response to the baseband processing payload being less than a first preset value, wherein N is a positive integer; or
    processing each uplink reference signal in a signal set according to a preset second condition in response to the baseband processing payload being greater than a second preset value, wherein the second preset value is greater than or equal to the first preset value, the signal set comprises one or more of the N uplink reference signals, and a baseband processing payload corresponding to processing an uplink reference signal according to the preset second condition is less than a baseband processing payload corresponding to processing an uplink reference signal according to the preset first condition.

* * * * *